United States Patent
Fukutomi et al.

(10) Patent No.: US 10,339,020 B2
(45) Date of Patent: Jul. 2, 2019

(54) OBJECT STORAGE SYSTEM, CONTROLLER AND STORAGE MEDIUM

(71) Applicant: Toshiba Memory Corporation, Minato-Ku, Tokyo (JP)

(72) Inventors: Kazuhiro Fukutomi, Yokohama Kanagawa (JP); Shingo Tanaka, Yokohama Kanagawa (JP)

(73) Assignee: Toshiba Memory Corporation, Tokyo (JP)

(*) Notice: Subject to any disclaimer, the term of this patent is extended or adjusted under 35 U.S.C. 154(b) by 345 days.

(21) Appl. No.: 15/266,034

(22) Filed: Sep. 15, 2016

(65) Prior Publication Data

US 2017/0286244 A1   Oct. 5, 2017

(30) Foreign Application Priority Data

Mar. 29, 2016   (JP) .................................. 2016-065573

(51) Int. Cl.
  *G06F 11/00*   (2006.01)
  *G06F 11/20*   (2006.01)
  *G06F 3/06*   (2006.01)

(52) U.S. Cl.
  CPC .......... *G06F 11/2094* (2013.01); *G06F 3/064* (2013.01); *G06F 3/0619* (2013.01); *G06F 3/0673* (2013.01); *G06F 3/0689* (2013.01); *G06F 2201/805* (2013.01); *G06F 2201/85* (2013.01)

(58) Field of Classification Search
  CPC .......... G06F 17/3033; G06F 17/30333; G06F 17/30336; G06F 17/3097; G06F 17/30982; G06F 12/0669; G06F 12/0246
  See application file for complete search history.

(56) References Cited

U.S. PATENT DOCUMENTS

| 5,111,444 A  * | 5/1992 | Fukushima ........ | G11B 20/1883 369/30.07 |
| 5,715,221 A  * | 2/1998 | Ito ...................... | G11B 20/1883 369/47.14 |
| 6,564,345 B1 * | 5/2003 | Kim ................... | G11B 20/1833 714/723 |
| 6,785,839 B2 * | 8/2004 | Ko ........................ | G11B 19/04 711/162 |

(Continued)

OTHER PUBLICATIONS

Tanenbaum "Modern Operaitng system 4th Edition" Mar. 2014, Pearson, 4th Edition, p. 181-262 (Year: 2014).*

*Primary Examiner* — Bryce P Bonzo
*Assistant Examiner* — Jeison C Arcos
(74) *Attorney, Agent, or Firm* — White & Case LLP

(57) ABSTRACT

According to one embodiment, an object storage system is configured to store a key and a value in association with each other. The object storage system includes a first storage region, a second storage region and a controller. The controller is configured to control the first storage region and the second storage region. The controller is configured to store the value in the first storage region, and to store first information and second information in the second storage region. The first information is used for managing an association between the key and a storage position of the value. The second information is used for managing a position of a defective storage area in the first storage region.

20 Claims, 15 Drawing Sheets

(56) References Cited

U.S. PATENT DOCUMENTS

| | | | | |
|---|---|---|---|---|
| 6,912,672 B2* | 6/2005 | Ko | ............... | G11B 19/04 |
| | | | | 369/47.17 |
| 7,000,152 B1* | 2/2006 | Lin | ............... | G11B 20/18 |
| | | | | 369/53.15 |
| 2006/0018166 A1* | 1/2006 | Iaculo | ............... | G11C 29/76 |
| | | | | 365/200 |
| 2006/0031710 A1* | 2/2006 | Jo | ............... | G06F 12/0246 |
| | | | | 714/5.1 |
| 2006/0109725 A1* | 5/2006 | Yoon | ............... | G06F 12/0246 |
| | | | | 365/200 |
| 2009/0013148 A1* | 1/2009 | Eggleston | ............... | G06F 12/0246 |
| | | | | 711/203 |
| 2009/0259799 A1* | 10/2009 | Wong | ............... | G06F 12/0207 |
| | | | | 711/103 |
| 2010/0217953 A1* | 8/2010 | Beaman | ............... | G06F 17/3033 |
| | | | | 711/216 |
| 2010/0287171 A1* | 11/2010 | Schneider | ............... | G06F 17/30864 |
| | | | | 707/759 |
| 2010/0293332 A1* | 11/2010 | Krishnaprasad | ............... | G06F 12/0813 |
| | | | | 711/119 |
| 2012/0036317 A1 | 2/2012 | Torii | | |
| 2013/0042060 A1* | 2/2013 | Marukame | ............... | G06F 17/30982 |
| | | | | 711/108 |
| 2013/0111187 A1* | 5/2013 | Liu | ............... | G06F 3/0614 |
| | | | | 711/216 |
| 2014/0189053 A1* | 7/2014 | Shi | ............... | H04L 67/10 |
| | | | | 709/217 |
| 2014/0279946 A1* | 9/2014 | Scarpino | ............... | G06F 17/30371 |
| | | | | 707/691 |
| 2016/0357634 A1* | 12/2016 | Wang | ............... | G06F 3/0617 |

* cited by examiner

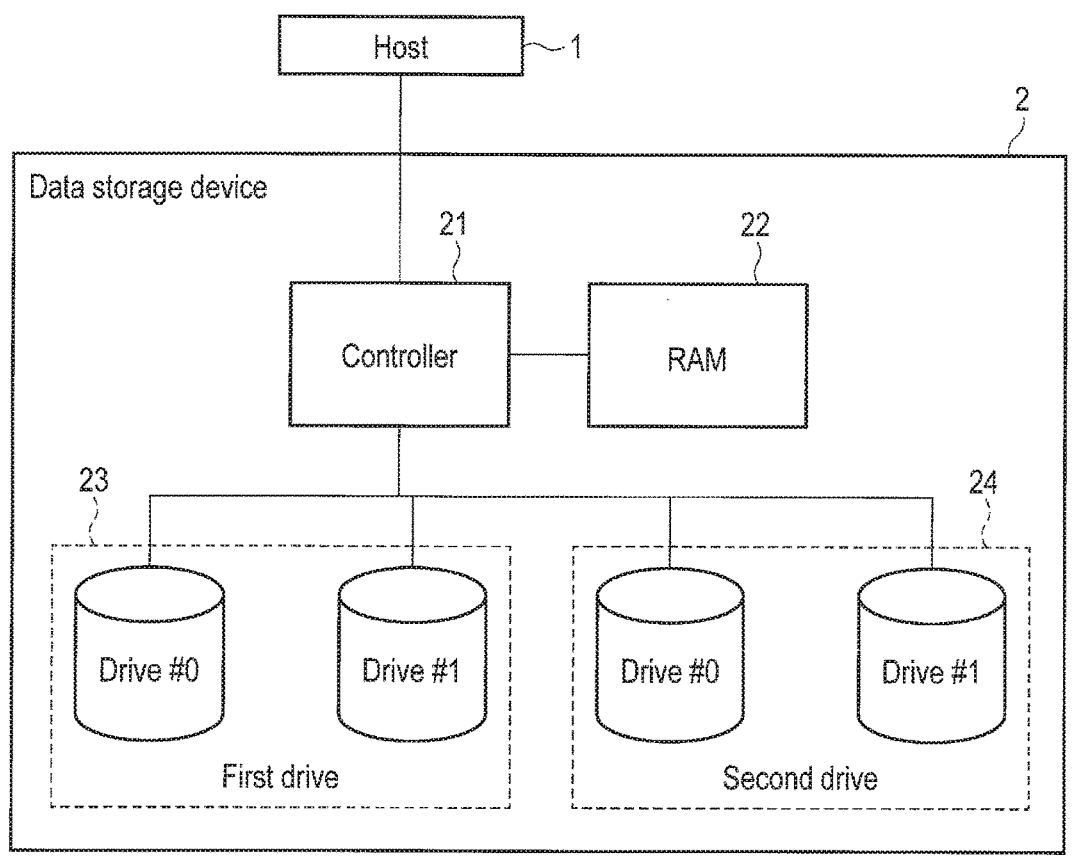
F I G. 1

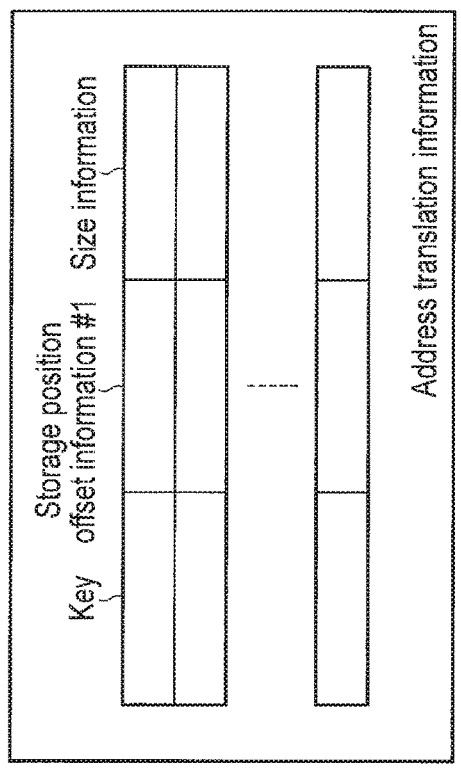
F I G. 7
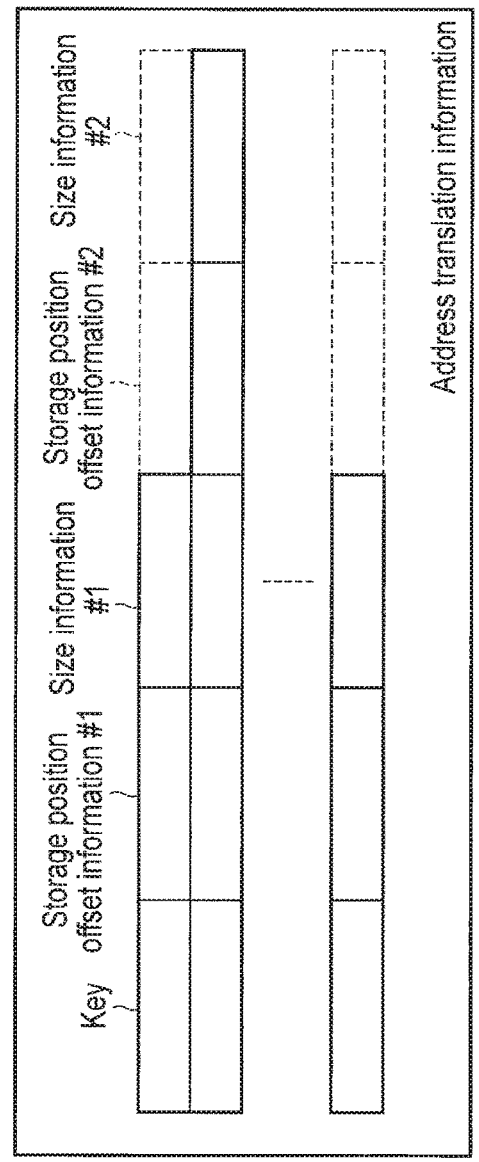
F I G. 8

Defective sector position information
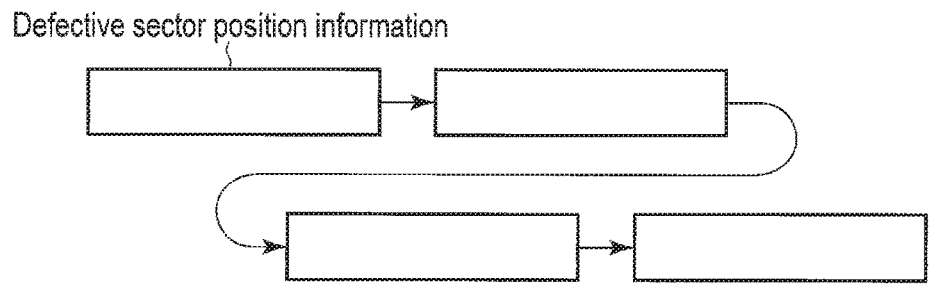
FIG. 9
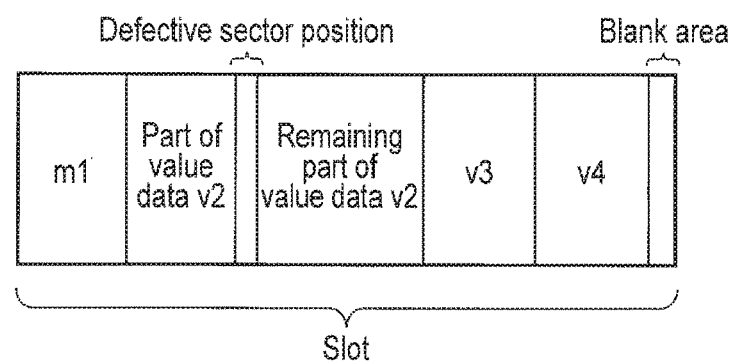
FIG. 10
FIG. 11

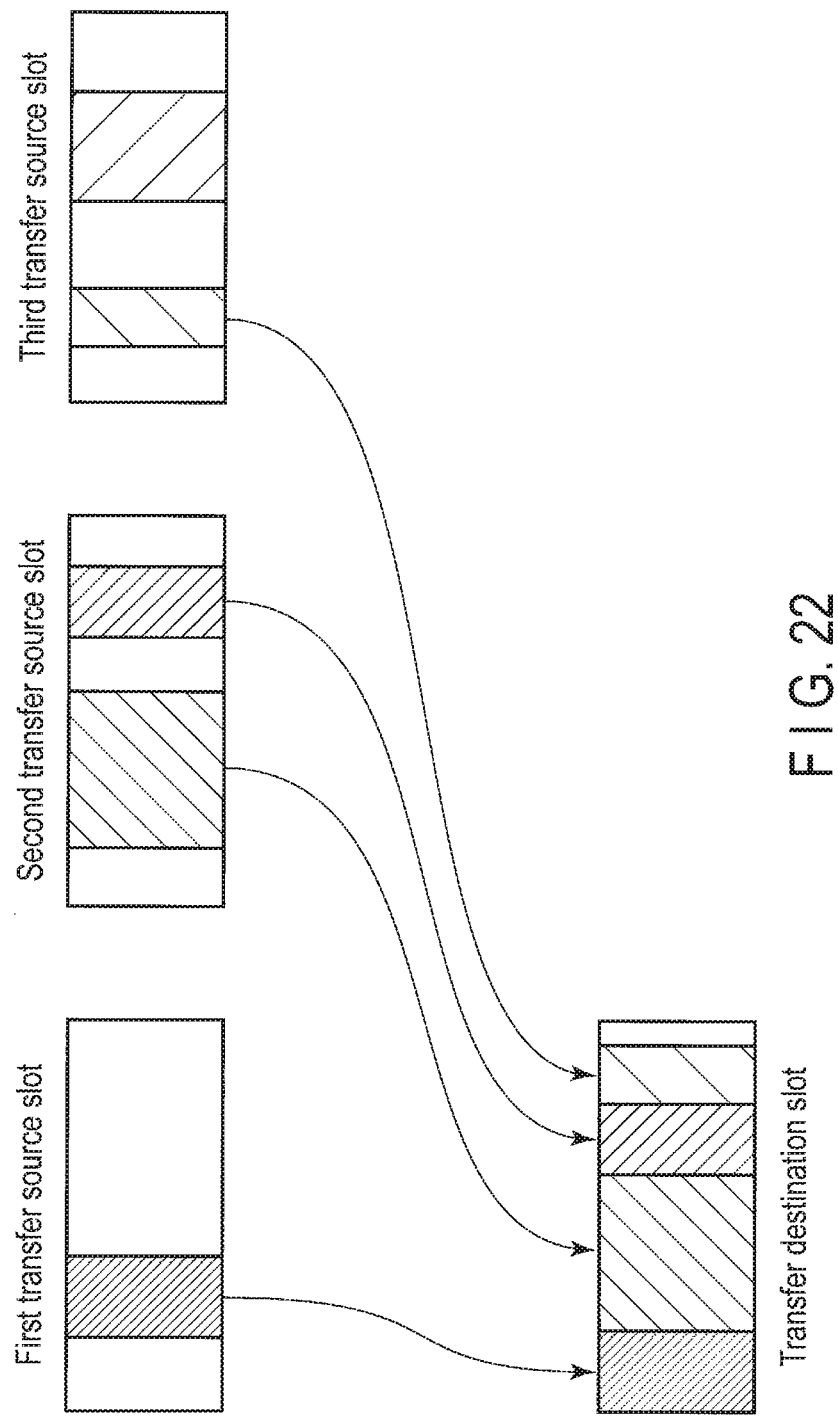
F I G. 22

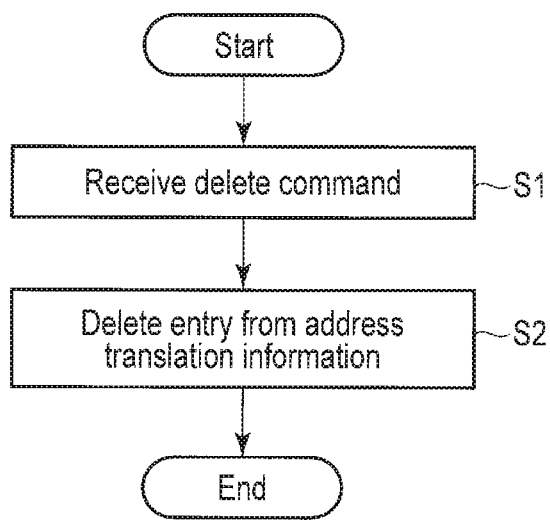
F I G. 25

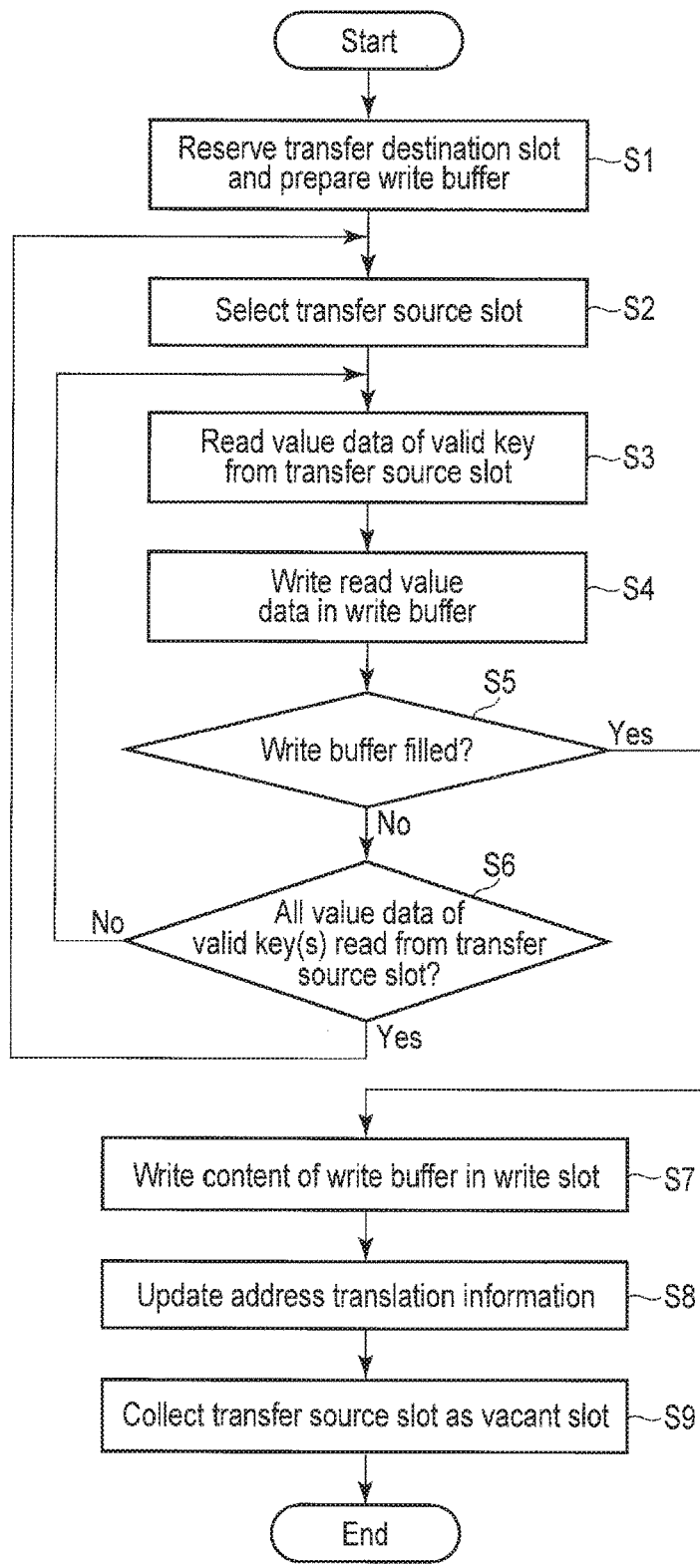
F I G. 26

OBJECT STORAGE SYSTEM, CONTROLLER AND STORAGE MEDIUM

CROSS-REFERENCE TO RELATED APPLICATIONS

This application is based upon and claims the benefit of priority from Japanese Patent Application No. 2016-065573, filed Mar. 29, 2016, the entire contents of which are incorporated herein by reference.

FIELD

Embodiments described herein relate generally to an object storage system, a controller and a storage medium.

BACKGROUND

In recent years, a storage system referred to as object storage which adopts a key-value store (KVS) storage interface with a host (client) is becoming widely used. In the KVS storage system, a write request from the host includes information of an identifier of write data, namely, information of a key, and write data, namely, data of a value (hereinafter referred to simply as value data). A read request from the host includes information of a key. As the key information, the storage system often uses a character string.

To improve the reliability of the storage system, it is necessary to use a highly reliable and expensive drive, and this leads to cost increase. In contrast, if an inexpensive drive is used, this not only causes performance penalties such as an increase in the downtime of the system and a decrease in the service performance of the system, but also causes increases in the cost for a replacement drive and in the operation cost of service personnel for drive replacement and rebuilding process.

BRIEF DESCRIPTION OF THE DRAWINGS

FIG. 1 is a block diagram showing an example of the general function structure of a data storage device of an embodiment.

FIG. 7 is a diagram showing an example of address translation information of the data storage device of the embodiment.

FIG. 8 is a diagram showing another example of the address translation information of the data storage device of the embodiment.

FIG. 9 is a diagram showing an example of defective sector information of the data storage device of the embodiment.

FIG. 10 is a diagram showing an example of in-slot defective sector presence information.

FIG. 11 is a diagram showing an example where there is a defective sector in a write slot of the data storage device of the embodiment.

FIG. 22 is a diagram showing an example of processing of transferring value data for collecting a vacant slot of the data storage device of the embodiment.

FIG. 25 is a flowchart showing an example of the procedure of delete processing executed by the data storage device of the embodiment.

FIG. 26 is a flowchart showing an example of the procedure of transfer processing executed by the data storage device of the embodiment.

DETAILED DESCRIPTION

Figure 2:
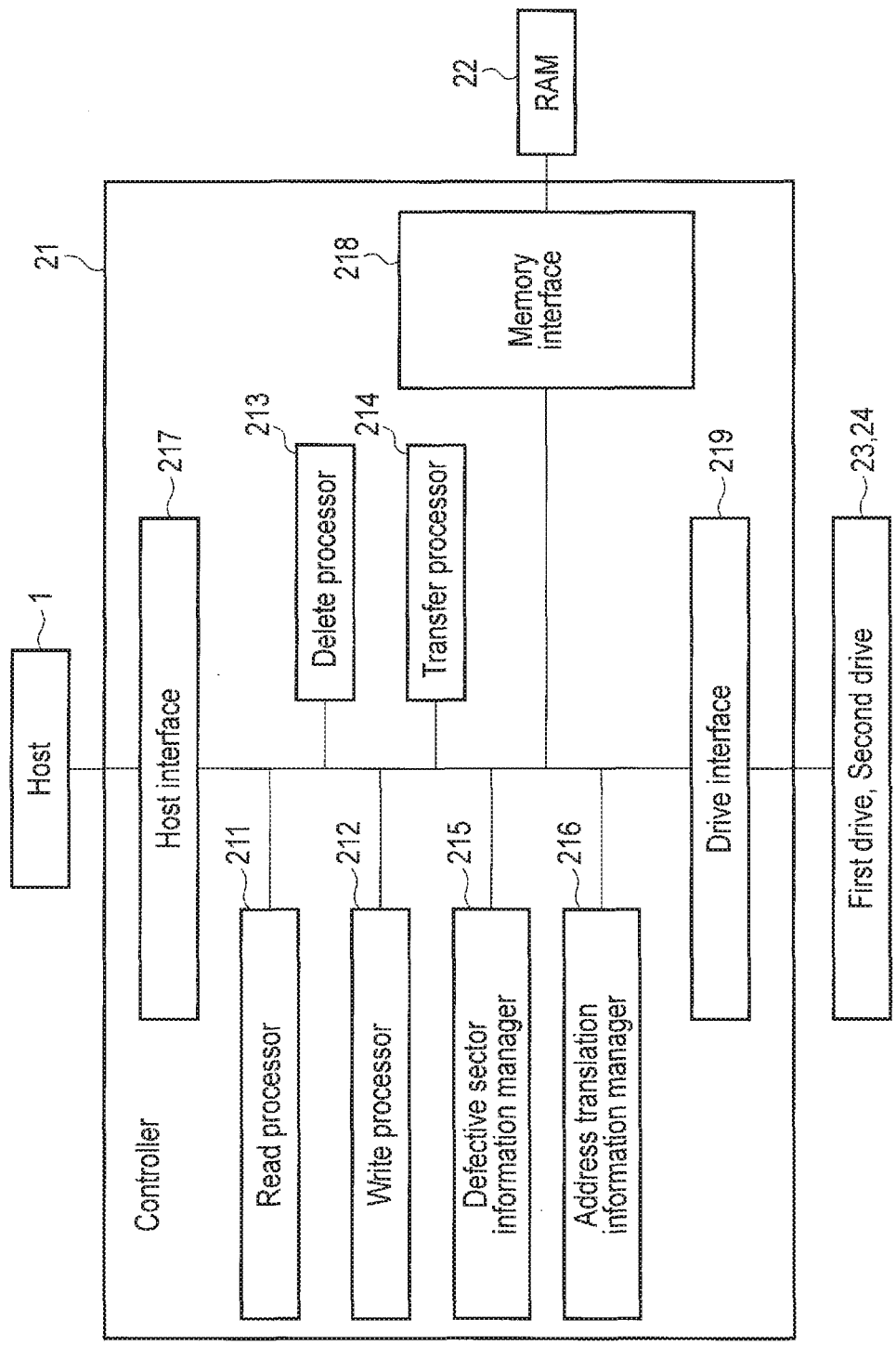
FIG. 2 is a block diagram showing an example of the general function structure of a controller of the data storage device of the embodiment.

In general, according to one embodiment, an object storage system is configured to store a key and a value in association with each other. The object storage system includes a first storage region, a second storage region and a controller. The controller is configured to control the first storage region and the second storage region. The controller is configured to store the value in the first storage region, and to store first information and second information in the second storage region. The first information is used for managing an association between the key and a storage position of the value. The second information is used for managing a position of a defective storage area in the first storage region.

Embodiments will be described hereinafter with reference to the accompanying drawings.

First, the structure of a data storage device of the present embodiment will be described.

FIG. 1 is a block diagram showing an example of the general function structure of a data storage device 2 of the present embodiment. The data storage device 2 is an object storage system which adopts a KVS storage interface with a host 1. As shown in FIG. 1, the data storage device 2 comprises a controller 21, a random access memory (RAM) 22, a first drive 23 (a first storage region), and a second drive 24 (a second storage region). Note that, although FIG. 1 shows an example where the data storage device 2 comprises two drives (#0 and #1) as the first drive 23 and two drives (#0 and #1) as the second drive 24, the number of the drives of each of the first drive 23 and the second drive 24 is not necessarily two. Each of the first drive 23 or the second drive 24 may include three or more drives or may include one drive. The number of the drives of the first drive 23 and the number of the drives of the second drive 24 may be different from each other. In the following, a plurality of drives will be collectively referred to as the first drive 23 or the second drive 24 as long as there is no need for differentiating the plurality of the drives of the first drive 23 or the second drive 24 from each other.

FIG. 2 is a block diagram showing an example of the general function structure of the controller 21. As shown in FIG. 2, the controller 21 comprises a read processor 211, a write processor 212, a delete processor 213, a transfer processor 214, a defective sector information manager 215, an address translation information manager 216, a host interface 217, a memory interface 218, and a drive interface 219. Here, each functional module of the controller 21 may be realized as firmware (program) which is executed by a processor in the controller 21.

Here, before the functional modules of the controller 21, the first drive 23 and the second drive 24 will be described in detail.

First, the first drive 23 will be described below.

The first drive 23 is a drive such as a hard disk drive (HDD) featuring large capacity and relatively-high-speed sequential access, but the first drive 23 is not limited to a drive of this kind.

Figure 3:
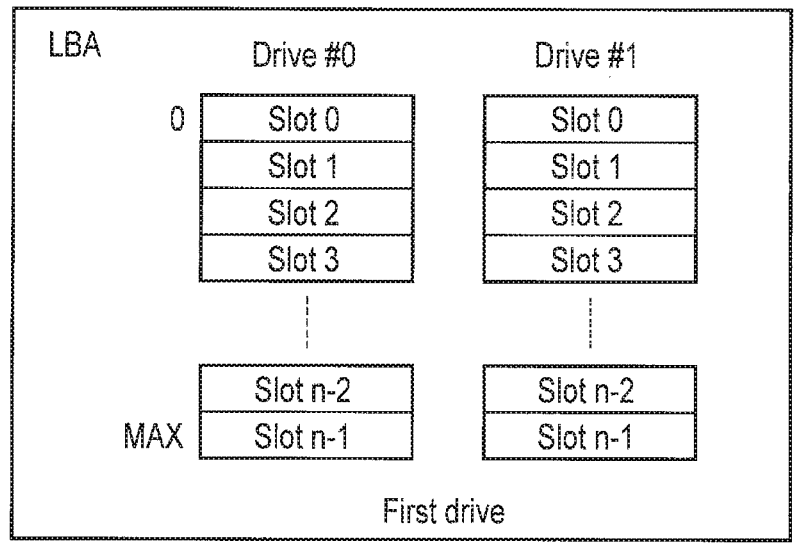
FIG. 3 is a diagram showing an example of segments of a first drive of the data storage device of the embodiment.

In the data storage device 2 of the present embodiment, value data is stored in the first drive 23. To conform to the sequential access operation, as shown in FIG. 3, the first drive 23 is segmented by slots. The size of the slot is, for example, 16 Mbytes but is not limited to this size. Further, in association with recent developments of large-capacity HDDs, Advanced Format HDDs have been developed. Therefore, if the size of the slot is not aligned with a unit of, for example, 4 Kbytes, the access operation performance may be degraded. For this reason, it is preferable that the size and the position of the slot should be aligned with an integral multiple of such a size and a position (4 Kbytes or the like) that the access operation performance of an Advanced Format HDD will not be degraded.

Figure 4:
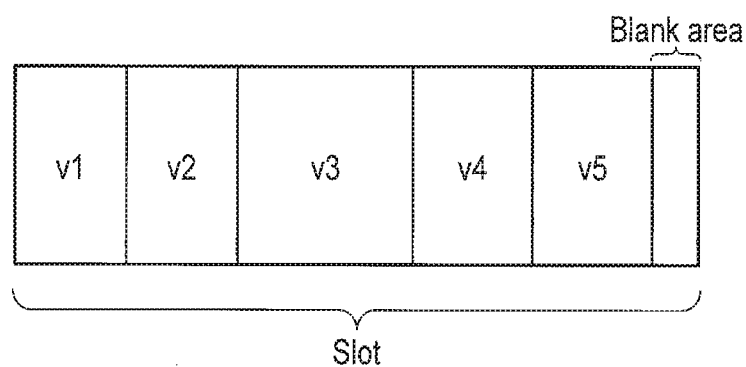
FIG. 4 is a diagram showing an example of a method of storing value data to a slot of the data storage device of the embodiment.

A method of storing value data to a slot is shown in FIG. 4. In FIG. 4, the slot includes value data v1 to v5. The slot may be filled with the value data in order from front to back as shown in FIG. 4 or may be filled with the value data in another predetermined order. In most cases, when the slot is filled with the value data, since the value data has various sizes, a blank area is created in the slot.

Figure 5:
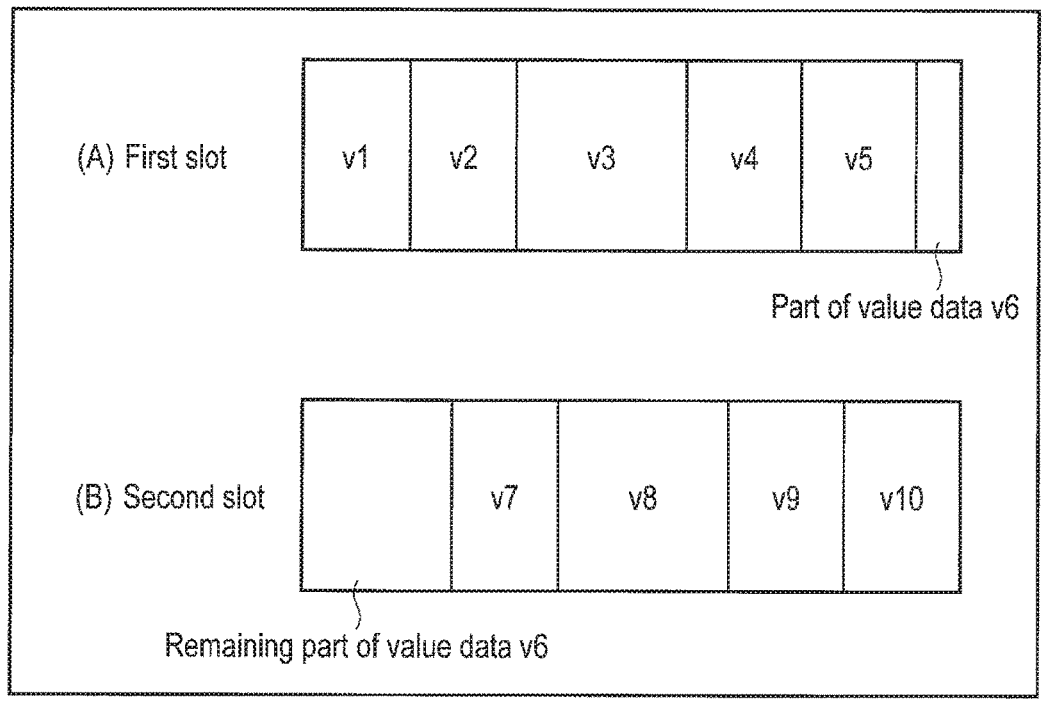
FIG. 5 is a diagram showing an example of a method of reducing a blank area in the slot of the data storage device of the embodiment.

A method of reducing the blank area of the slot is shown in FIG. 5. In the method shown in FIG. 5, a part of value data v6 is stored at the end of the first slot (FIG. 5 (A)), and then the remaining part of value data v6 is stored at the front of the second slot (FIG. 5 (B)). That is, it is possible to reduce the blank area of the slot by storing a single item of value data separately in a plurality of slots. Note that, even if a slot contains a blank area, value data is not necessarily stored separately. For example, value data may be stored separately up to the 63rd slot such that no blank area will be created in the slot, but value data may not be stored separately in the 64th slot such that a blank area will be maintained in the slot, if any. That is, for example, the separate storage processing may be stopped every 64 slots. If the separate storage processing is stopped every predetermined units in this way, various processing can be simplified.

Figure 6:
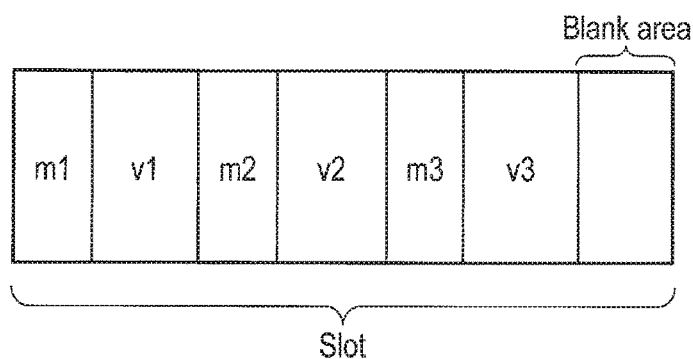
FIG. 6 is a diagram showing an example of a method of storing metadata to the slot of the data storage device of the embodiment.

Further, in the first drive 23, more specifically, in the slot, not only value data but also metadata related to the value data may be stored. The metadata may include, among address translation information which will be described later, various kinds of information related to the value data such as entry information related to the value data and an error-correcting code of the value data. In this way, the reliability of the whole data storage device 2 can be improved. An example is shown in FIG. 6. Note that, in FIG. 6, metadata m1 to m3 corresponding to value data v1 to v3 are stored next to value data v1 to v3, but metadata may be stored collectively or in various other predetermined orders. Further, it is also possible to perform the metadata storage processing in combination with the above-described separate storage processing of the value data.

Next, the second drive 24 will be described.

The second drive 24 is a drive such as a solid state drive (SSD) featuring fast response time and relatively-high-speed random access, but the second drive 24 is not limited to a drive of this type. The second drive 24 is preferably a drive featuring fast response time and relatively-high-speed random access because address translation information, defective sector information, in-slot defective sector presence information and the like stored in the second drive 24 will be accessed every time a write command or a read command is issued from the host 1.

In the data storage device 2 of the present embodiment, the address translation information is stored in the second drive 24. The address translation information is used for extracting storage position information of value data from key information. An example of the address translation information is shown in FIG. 7. The address translation information includes a plurality of entries. Each entry includes key information, storage position offset information, and size information. The storage position offset information indicates the storage position of value data. The storage position offset information includes information which identifies one of a plurality of drives mounted as the first drive 23 (first drive identification information) and information which specifies a position in the one of the plurality of drives (in-first-drive position specification information). For example, the following information can be used as the in-first-drive position specification information, but the in-first-drive position specification information may be any information as long as the information can specify a storage position in each drive:

(1) logical block addressing (LBA); or (2) serial numbers of slots in each drive and offset information in each slot.

The size information indicates the size of value data. For example, the following information can be used as the value data size information, but the value data size information may be any information as long as the information can specify the size of the value data:

(1) the number of sectors; or (2) the number of bytes.

Further, when value data is stored separately in a plurality of slots as described above, a set of the storage position offset information and the size information is required for each part of the separate value data. An example is shown in FIG. 8. In FIG. 8, value data is divided into two at most, and the address translation information includes a set of the first storage position offset information and the size information, and a set of the second storage position offset information and the size information, but value data is not necessarily divided into two. Further, the second storage position offset information and the size information are not necessarily assigned to all entries, but to reduce the volume of the address translation information, the second storage position offset information and the size information may be assigned only to separately-stored value data as shown in FIG. 8.

The number of entries in the address translation information corresponds to the total number of the keys stored in the data storage device 2. The entry may be managed in various other manners. For example, it is possible to manage the number of entries to correspond to the total number of the keys by appropriately extending or shortening the array of entries or by appropriately obtaining or releasing entries in the form of a list, a binary search tree or the like.

Further, in the data storage device 2 of the present embodiment, the defective sector information is stored in the second drive 24. An example is shown in FIG. 9. The defective sector information is used for managing the position of a defective sector in the first drive 23. The defective sector information includes information which specifies the position of a defective sector, namely, defective sector position information. As the defective sector position information, information similar to the above-described storage position offset information can be adopted. The defective sector information may be realized, for example, as a list of defective sector position information as shown in FIG. 9. Note that the defective section information is not necessarily realized in any particular form. For example, it is possible to manage the defective sector information by appropriately extending or shortening the array of entries or by appropriately obtaining or releasing entries in the form of a bidirectional list, a binary search tree or the like. Further, to reduce the search cost, the defective sector information may not be realized collectively as a single list, but the defective sector information may be realized individually, for example, as a list for each slot containing a defective sector.

Still further, to reduce the search cost of the defective sector information, in-slot defective sector presence information may also be stored. An example is shown in FIG. 10. In FIG. 10, in two drives mounted as the first drive 23, namely, drive 0# and drive #1, "1" is stored if the slot contains a defective sector, while "0" is stored if the slot does not contain any defective sector. In this case, it is possible to search the defective sector information simply by searching a slot in which "1" is stored. In this way, the search cost of the defective sector information can be reduced. Further, instead of storing "1" in all slots containing defective sectors, it is also possible store the number of defective sectors. In that way, the degree of the search cost can be estimated beforehand.

Note that it is not necessary to realize both the in-slot defective sector presence information and the defective sector information as an individual list for each slot containing a defective sector as described above. It is still possible to reduce the search cost of the defective sector information simply by realizing either one of the above information.

Note that, in the second drive 24, the address translation information, the defective sector information and the in-slot defective sector presence information may be stored in various formats. The information may be stored as a file in a file system or may be managed separately as storage LBA. Further, as the structure of a plurality of drives mounted as the second drive 24, it is possible to adopt a redundant structure conforming to redundant array of inexpensive disks (RAID) 1 or RAID 5 to improve the reliability of the data storage device 2, or it is also possible to adopt a structure conforming to RAID 0 to increase the capacity for storing the address translation information and the defective sector information.

Still further, since the second drive 24 features fast response time and high-speed random access, it is possible to increase the responsiveness to the request from the host 1 by caching value data from the first drive 23 to the second drive 24.

Next, based on the above description of the first drive 23 and the second drive 24, each functional module of the controller 21 shown in FIG. 2 will be described below.

The host interface 217 performs interface processing between the host 1 and each functional module of the controller 21. More specifically, the host interface 217 receives commands including a write command, a read command and a delete command from the host 1. The write command includes information of an identifier of write data, namely, information of a key, and the write data, namely, data of a value. The read command includes information of a key. The delete command includes information of the key of data to be deleted.

The host interface 217 transfers the received command to the write processor 212 if the received command is a write command, and transfers the received command to the read processor 211 if the received command is a read command. Further, the host interface 217 transfers the received command to the delete processor 213 if the received command is a delete command.

When receiving read data from the read processor 211, the host interface 217 transfers the received data to the host 1.

The memory interface 218 performs interface processing between the RAM 22 and each functional module of the controller 21. More specifically, the memory interface 218 receives a requester's instruction to read data from the RAM 22, reads data corresponding to the read instruction from the RAM 22, and returns the read data to the requester. Further, the memory interface 218 receives a requester's instruction to write data in the RAM 22, inputs data corresponding to the write instruction to the RAM 22, and performs write processing.

The drive interface 219 performs interface processing between the first drive 23 and the second drive 24, and each functional module of the controller 21. More specifically, the drive interface 219 receives a requester's instruction to read data from the first drive 23 or the second drive 24, reads data corresponding to the read instruction from the first drive 23 or the second drive 24, and returns the read data to the requester. Further, the drive interface 219 receives a requester's instruction to write data in the first drive 23 or the second drive 24, inputs data corresponding to the write instruction to the first drive 23 or the second drive 24, and executes write processing.

The address translation information manager 216 refers to and updates, according to a request from a requester, the address translation information stored in the second drive 24 via the drive interface 219. Here, to ensure the consistency of responses to reference and update requests from a plurality of requesters, the processing is collectively performed by the address translation information manager 216. Therefore, as long as the consistency of responses is ensured, it is also possible to separately perform the processing by various functional modules in cooperation with each other instead of collectively performing the processing by the address translation information manager 216. In the following, the processing may be performed in either manner.

The defective sector information manager 215 refers to and updates, according to a request from a requester, the defective sector information and the in-slot defective sector presence information stored in the second drive 24 via the drive interface 219. Here, to ensure the consistency of responses to reference and update requests from a plurality of requesters, the processing is collectively performed by the defective sector information manager 215. Therefore, as long as the consistency of responses is ensured, it is also possible to separately perform the processing by various functional modules in cooperation with each other instead of collectively performing the processing by the defective sector information manager 215. In the following, the processing may be performed in either manner.

The RAM 22 temporarily stores data corresponding to a write request from the host 1 as a write cache.

Further, the RAM 22 may cache information necessary for various operations such as the address translation information, the defective sector information, and the in-slot defective sector presence information. Still further, the RAM 22 may cache data corresponding to a read request from the host 1. Note that, unless there is a need for particularly differentiating the storage of the information on the RAM 22, the processing of caching the information necessary for various operations and the processing of caching the data corresponding to the read request will not be described below. However, the above-described processing may be appropriately adopted in the following description.

The write processor 212 processes a write command from the host 1. The processing will be described below.

When receiving a write command from the host interface 217, the write processor 212 extracts key information and value data from the received write command.

The write processor 212 determines whether a write slot has been reserved or not.

If a write slot has not been reserved, the write processor 212 reserves a write slot. The write processor 212 reserves a write slot from slots in which no valid data is stored (vacant slots). As the method of selecting the write slot, any well-known method can be used. Further, the write processor 212 reserves a write buffer of the size of the slot in the RAM 22.

Still further, the write processor 212 lists the position of a defective sector of the write slot, if any. More specifically, the write processor 212 refers to the in-slot defective sector presence information via the defective sector information manager 215, determines whether the write slot contains any defective sector or not, and lists, if the write slot contains a defective sector, the position of the defective sector of the write slot based on the defective sector information.

The write processor 212 writes value data corresponding to the write request in the write buffer until the write buffer is filled with the value data. More specifically, if the write slot does not contain any defective sector, the write processor 212 writes value data such as, for example, value data shown in FIG. 4 in the write buffer via the memory interface 218. In contrast, an example where the write slot contains a defective sector is shown in FIG. 11. In writing the value data in the write butter, if the position of a defective sector overlaps the write area of the value data, the write processor 212 writes the value data while skipping the position of the defective sector via the memory interface 218. In the example shown in FIG. 11, since the write area of value data v2 overlaps the position of the defective sector, the write processor 212 writes value data v2 in the write buffer while skipping the position of the defective sector.

Figure 12:
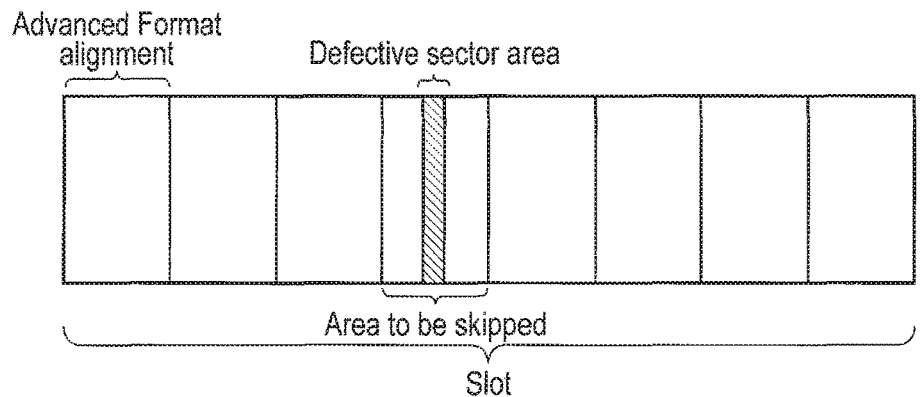
FIG. 12 is a diagram showing another example where there is a defective sector in a write slot of the data storage device of the embodiment.

Note that the size and the position of the area to be skipped should preferably be aligned with an integral multiple of such a size and a position that the access performance of an Advanced Format HDD will not be degraded (4 Kbytes or the like). In that case, the area to be skipped may become greater than the actual defective sector area. An example is shown in FIG. 12. In FIG. 12, the slot size and the slot position are aligned with an integral multiple of the size and the position of the Advanced Format (4 Kbytes or the like). In the example of FIG. 12, the slot size is eight times the size of the Advanced Format. In general, the size of the defective sector (512 bytes or the like) often becomes less than the size of the Advanced Format, and thus the area to be skipped becomes greater than the actual defective sector area.

Note that there is also a case where the area to be skipped contains a plurality of defective sectors. Therefore, instead of managing the defective sector information individually for each defective sector, it is also possible to manage the defective sector information collectively for each area to be skipped.

Figure 13:
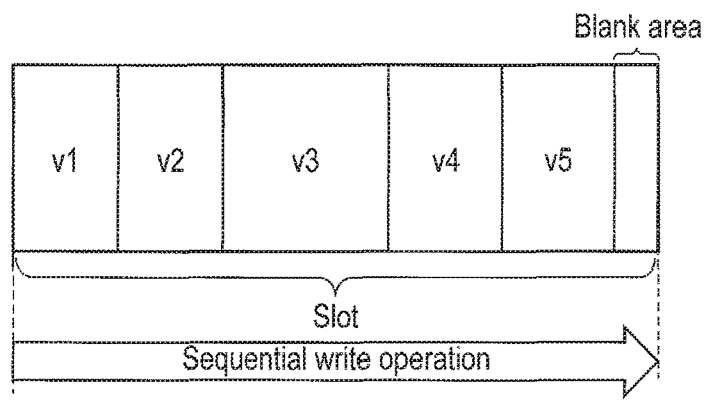
FIG. 13 is a diagram showing an example where there is no defective sector in a write slot of the data storage device of the embodiment.
Figure 14:
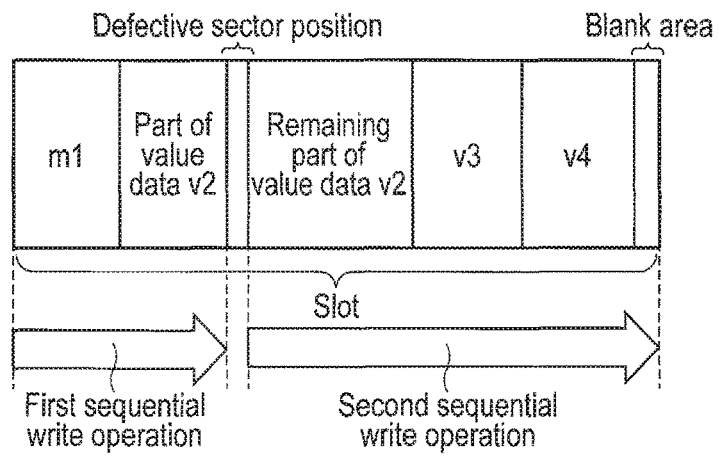
FIG. 14 is a diagram showing an example where there is a defective sector in a write slot of the data storage device of the embodiment.

When the write buffer is filled with the value data, the write processor 212 writes the content of the write buffer in the write slot. An example where the write slot does not contain any defective sector is shown in FIG. 13. As shown in FIG. 13, the write processor 212 reads the content of the write buffer including the blank area via the memory interface 218 and sequentially writes the read content in the write slot via the drive interface 219. In contrast, an example where the write slot contains a defective sector is shown in FIG. 14. As shown in FIG. 14, the write processor 212 reads the content of the write buffer via the memory interface 218 and sequentially writes the read content in the write slot while skipping the area to be skipped (the position of the defective sector in the example shown in FIG. 14) via the drive interface 219. In the example shown in FIG. 14, two sequential write operations are performed in total. In this case, although there is a defective sector to be skipped, the addresses of sequential write operations are arranged along the same line via the defective sector. Therefore, even if the first drive 23 is an HDD, the speed of the write processing is less likely to decrease.

This technical effect will be described with reference to FIG. 15.

Figure 15:
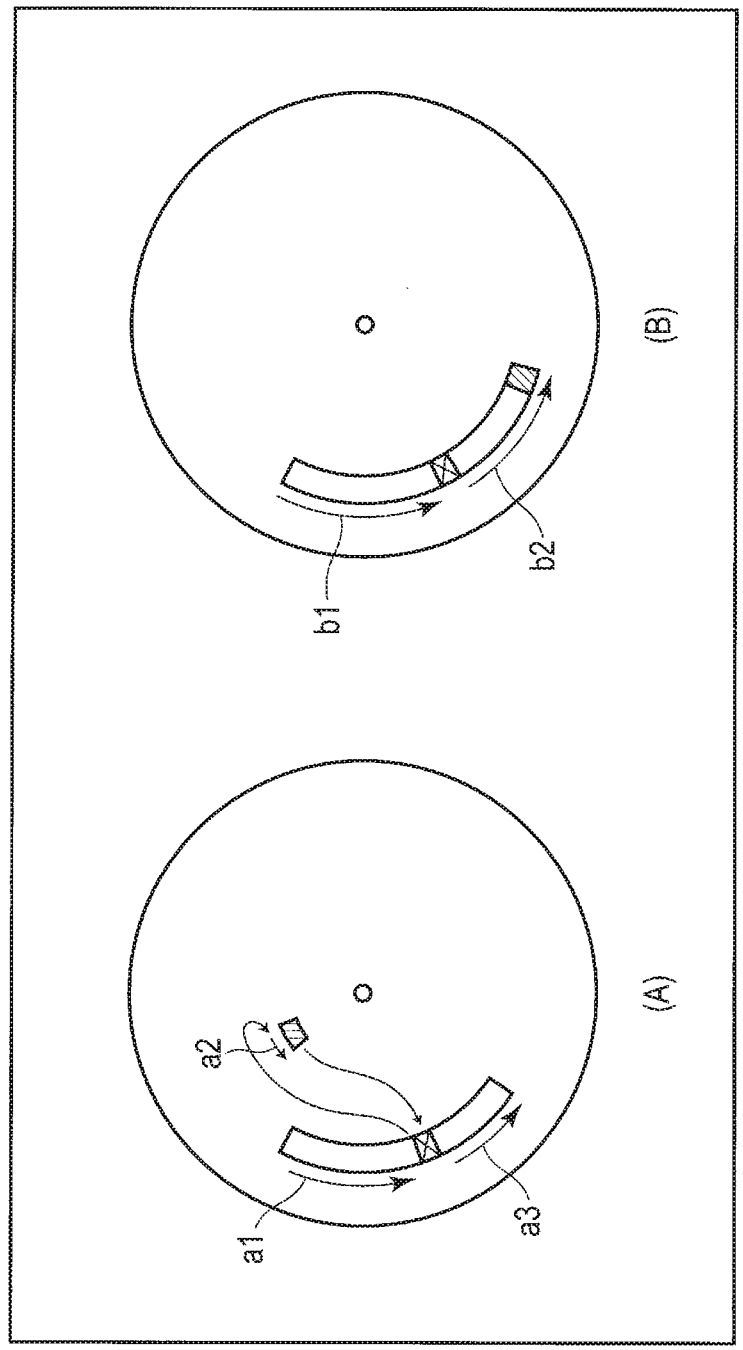
FIG. 15 is a diagram showing an example of sequential write operations with a skip operation of a defective sector of the data storage device of the embodiment.

For example, as in the case of a storage system which has an LBA interface with a host (client), if a method of replacing a defective sector with a spare sector is used as a defective sector management method, as shown in FIG. 15 (A), after the first sequential write operation (a1) is performed, the head is moved to the spare sector replaced with the defective sector, and then the second sequential write operation (a2) is performed. Further, after the second sequential write operation (a2) is performed, it is necessary to move the head back to the position of the first sequential write operation (a1) to perform the third sequential write operation (a3).

On the other hand, if a method of skipping a defective sector is used as a defective sector management method, as shown in FIG. 15 (B), it is possible to perform the first sequential write operation (b1) and the second sequential write operation (b2) without moving the head back and forth.

This technical effect is produced not only in the write processing but also in the read processing. The defective sector management processing in the read processing will be described later in the description of the read processor 211.

Further, if a write error occurs in the sequential write operation, the write processor 212 updates the defective sector position information and the in-slot defective sector presence information for the sector in which the write error has occurred via the defective sector information manager 215. Still further, according to the updated defective sector position information and the updated in-slot defective sector presence information, the write processor 212 fills the write buffer again. More specifically, the write processor 212 resets an area to be skipped based on the updated defective sector position information and the updated in-slot defective sector presence information. Here, the write slot is not necessarily the slot in which the write error has occurred but may be a slot which is newly reserved from vacant slots.

Then, based on the content of the write buffer which has been filled again, the write processor 212 sequentially writes the content in the write slot while skipping the area to be skipped as necessary.

When the write processing is complete properly, the address translation information for the written value data is updated. More specifically, the write processor 212 adds the entry of the written value data including the key information, the storage position offset information, and the size information to the address translation information via the address translation information manager 216.

Here, in the key information, the information of the key extracted from the write command may be stored. In the storage position offset information, the front position of the written value data may be stored. Further, in the size information, regardless of whether the value data is written in the slot continuously without any skip operation or the value data is written in the slot intermittently with the skip operation of the area to be skipped, the size of the value data extracted from the write command may be stored. Here, to reduce the volume of the address translation information, the same size of the value data is stored as the size information regardless of whether the value data is written in the slot continuously without any skip operation or the value data is written in the slot intermittently with the skip operation of the area to be skipped. In general, the number of entries of the address translation information becomes significantly large. Therefore, if different storage formats are used for the address translation information of the value data written in the slot continuously without any skip operation and for the address translation information of the value data written in the slot intermittently with the skip operation of the area to be skipped, since the number of entries of the address translation information is large, the volume of the address translation information becomes enormous. Therefore, in the read processing, to properly execute the read processing, it is necessary to differentiate between the value data which has been written in the slot continuously without any skip operation and the value data which has been written in the slot intermittently with the skip operation of the area to be skipped. More specifically, the processing will be described later in the description of the read processor 211.

The read processor 211 processes a read command from the host 1. The processing will be described below.

When receiving a read command from the host interface 217, the read processor 211 extracts key information from the received read command.

Figure 16:
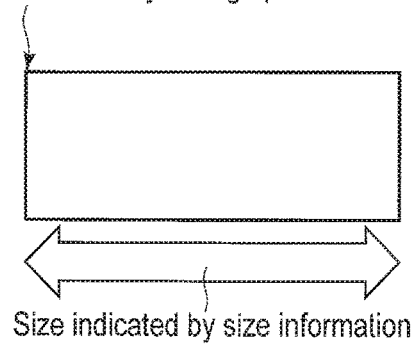
FIG. 16 is a diagram showing an example of processing of estimating a storage area of the data storage device of the embodiment.

The read processor 211 estimates (provisionally determines) an area in which value data corresponding to the key is written. More specifically, based on the extracted key information, the read processor 211 refers to the address translation information via the address translation information manager 216 and obtains the storage position offset information and the size information. Then, the read processor 211 sets an area starting from the position indicated by the storage position offset information and having the size indicated by the size information, as an estimated area. An example is shown in FIG. 16.

Note that, when determining that a magic number is stored in the obtained storage position offset information or the obtained size information, the read processor 211 returns a read error to the host 1 via the host interface 217. The magic number may be, for example, a numerical value which will not be used as the storage position offset information or the size information. More specifically, for example, if the maximum size of a value data that the data storage device can accept is 9,999 Mbytes, a numerical value representing 10,000 Mbytes can be adopted as the magic number, but the magic number is not limited to this value.

Figure 17:
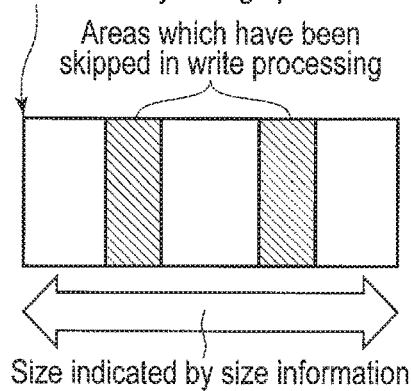
FIG. 17 is a diagram showing an example where the estimated area includes areas which have been skipped in write processing.

The read processor 211 determines whether the estimated area includes an area which has been skipped in the write processing (defective sector) or not. More specifically, the read processor 211 refers to the in-slot defective sector presence information for the slot belonging to the storage position indicated by the storage position offset information via the defective sector information manager 215, and determines whether there is any defective sector in the slot. If there is a defective sector in the slot, the read processor 211 refers to the defective sector position information via the defective sector information manager 215, and determines whether the estimated area includes an area which has been skipped in the write processing (defective sector) or not. An example where the estimated area includes skipped areas is shown in FIG. 17. In the example shown in FIG. 17, the estimated area shown in FIG. 16 includes two skipped areas.

Figure 18:
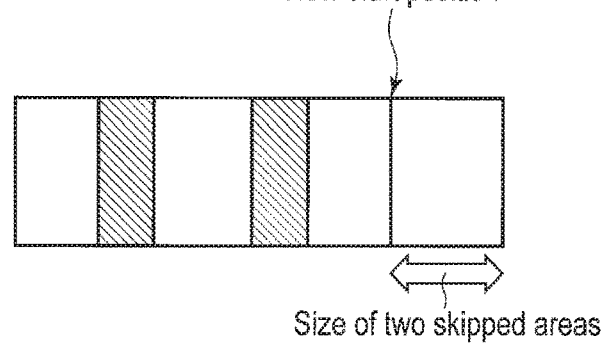
FIG. 18 is a diagram showing an example of processing of newly estimating a storage area of the data storage device of the embodiment.

If the estimated area includes areas which have been skipped in the write processing (defective sectors), the read processor 211 sets the end position of the estimated area as a new start position and the size of the total area of the skipped areas included in the estimated area as a new size, and sets this area defined by the new start position and the new size as a new estimated area. An example of the new estimated area in the example shown in FIG. 17 is shown in FIG. 18. In the example shown in FIG. 18, since the estimated area includes two skipped areas, the new size corresponds to the total size of the two skipped areas.

According to the above-described procedure, the read processor 211 continues adding a new estimated area until the estimated area will no longer include any area which has been skipped in the write processing (defective sector). Here, it is assumed that the new estimated area shown in FIG. 18 does not include any area which has been skipped in the write processing.

Figure 19:
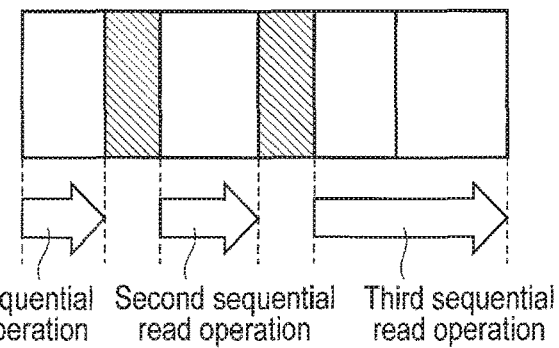
FIG. 19 is a diagram showing an example of sequential read operations of estimated areas including areas which have been skipped in write processing of the data storage device of the embodiment.

The read processor 211 sequentially reads the value data from all the estimated areas while skipping the areas which have been skipped in the write processing (defective sectors) via the drive interface 219. An example of the sequential read operations of the estimated areas shown in FIG. 18 are shown in FIG. 19. In FIG. 19, as the areas which have been skipped in the write processing (defective sectors) are skipped, three sequential read operations are performed. In this way, since the defective sectors are skipped but arranged between the addresses of the sequential read operations, even if the first drive 23 is an HDD, the speed of the processing is less likely to decrease in a manner similar to that of the above-described write processing (see FIG. 15).

Figure 20:
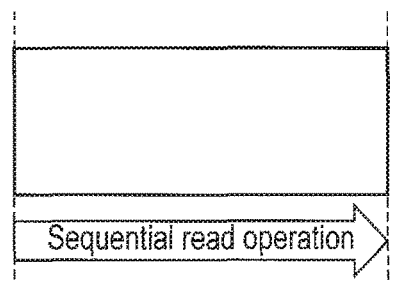
FIG. 20 is a diagram showing an example of a sequential read operation of an estimate area including no area which has been skipped in write processing of the data storage device of the embodiment.

In contrast, an example of the sequential read operation of the estimated area shown in FIG. 16 which does not include any area which has been skipped in the write processing (defective sector) is shown in FIG. 20. In FIG. 20, since the estimated area does not include any area which has been skipped in the write processing (defective sector), one sequential read operation is performed.

In the case of reading value data while skipping areas which have been skipped in the write processing, the read processor 211 connects all the read data and returns it to the host 1 via the host interface 217. Here, the RAM 22 may be used as a working area for connecting the read data. In the case of reading value data without skipping any area, the read data may be directly returned to the host 1 via the host interface 217.

If a read error occurs in the sequential read operation, the read processor 211 performs error management processing.

More specifically, the read processor 211 updates the defective sector position information and the in-slot defective sector presence information for the sector in which the read error has occurred via the defective sector information manager 215. In this way, when the slot is collected as a vacant slot in the transfer processing which will be described later and is then reserved as a write slot, the write processing will be performed properly.

Figure 21:
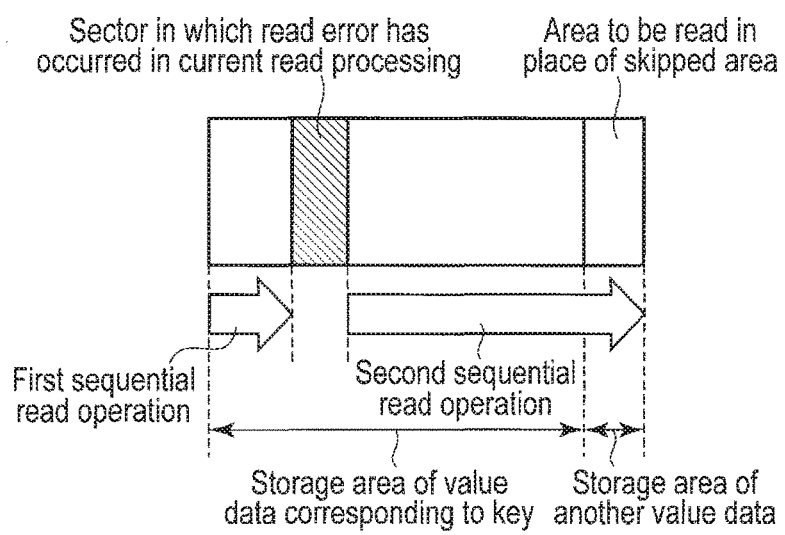
FIG. 21 is a diagram showing an example of processing of updating the address translation information for storing a magic number of the data storage device of the embodiment.

Further, the read processor 211 updates the address translation information for the data corresponding to the read error via the address translation information manager 216 for storing the magic number in the storage position offset information or the size information. In this way, even if a read request is made for the same key again, the processing will be performed properly. A specific example is shown in FIG. 21. In the storage area of the value data corresponding to the key, the sector in which the read error has occurred in the current read processing is included. Therefore, the defective sector position information is updated as described above, and the sector in which the read error has occurred is registered in the defective sector position information. If a read request is made to the same key in this state, the processing is performed according to the above-described read processing, that is, the sector in which the read error has occurred in the current read processing will be skipped and an area which is subsequent to the area of the value data corresponding to the key and in which another data is stored will be read. As a result, the read error will not occur, but the incorrect data will be returned to the host 1. Therefore, to return a read error to the host 1 when the read request is made to the same key again, the magic number is stored in the storage position offset information or the size information. Here, it is also possible to delete the key information from the address translation information instead of storing the magic number. In that case, when a read request is made to the same key again, the read request will be processed as a read request to a key which is not stored in the address translation information. Here, it is also possible to return a read error to the host 1 when a read request is made to a key which is not stored in the address translation information.

Further, with respect to the data in which the read error has occurred, the read processor 211 returns a read error to the host 1 via the host interface 217.

The delete processor 213 processes a delete command from the host 1. The processing will be described below.

When receiving a delete command from the host interface 217, the delete processor 213 extracts key information from the received delete command.

The delete processor 213 deletes the extracted key information from the address translation information. More specifically, the delete processor 213 deletes an entry including the extracted key information from the address translation information via the address translation information manager 216.

Next, the transfer processor 214 will be described.

If the processing for the write command from the host 1 and the processing for the delete command from the host 1 are continuously performed, the storage area of value data corresponding to a deleted key becomes a vacant area, but before long, there will be no write slot left for the processing for the write command. Therefore, the transfer processor 214 transfers value data corresponding to a valid key which has not been deleted yet to another write slot and collects the transfer source slot as a vacant slot. An example is shown in FIG. 22. In FIG. 22, there are value data corresponding to five valid keys in three transfer source slots in total, and value data corresponding to four valid keys are transferred to another slot. As a result, since the value data corresponding to the valid keys have been transferred from the first and second transfer source slots, the first and second transfer source slots can be collected as vacant slots. However, the third transfer source slot cannot be collected as a vacant slot because the value data corresponding to one valid key still remains in the third transfer source slot. In the above-described transfer processing, since one slot is used as a transfer destination slot and two slots are collected as vacant slots, one write slot is obtained.

The transfer processor 214 performs transfer processing if predetermined conditions are satisfied. As the predetermined conditions, any well-known methods can be used. For example, the transfer processing is executed if the number of remaining vacant slots becomes less than a predetermined number. Further, when a read command or a write command is issued from the host 1 while the transfer processing performed, there is a case where the response speed to the read command or the write command from the host 1 or the transfer processing speed decreases. Therefore, for example, the transfer processing may be executed if the load of the command from the host 1 becomes less than a predetermined threshold.

The transfer processor 214 reserves a transfer destination slot to which value data is transferred, lists the position of a defective sector in the reserved slot, and prepares a write buffer. Here, the processing is similar to the processing of the write processor 212, and thus detailed description thereof will be omitted.

The transfer processor 214 selects a transfer source slot from which value data is transferred. As the method of selecting the transfer source slot, any well-known method can be used. For example, if a slot whose total size of value data corresponding to valid keys is the smallest is selected first, a greater number of slots can be collected as vacant slots in one transfer processing. Therefore, the method of selecting a slot whose total size of value data corresponding to valid keys is the smallest first may be used as an example, but this is in no way restrictive. Further, the total size of value data corresponding to valid keys in the slot may be calculated from the address translation information or may be managed separately from the address translation information.

The transfer processor 214 reads value data corresponding to valid keys from the transfer source slot. Here, the processing of reading the value data corresponding to the valid keys is similar to the processing of the read processor 211, and thus detailed description thereof will be omitted.

The transfer processor 214 writes the read value data in the write buffer. Here, the processing of writing the value data in the write buffer is similar to the processing of the write processor 212, and thus detailed description thereof will be omitted.

The transfer processor 214 appropriately repeats the above-described processing until the write buffer is filled with the value data.

The transfer processor 214 writes the content of the write buffer in the write slot. Here, the processing of writing the content of the write buffer in the write slot is similar to the processing of the write processor 212, and thus detailed description thereof will be omitted.

When the write processing is complete properly, the transfer processor 214 updates the address translation information for the written value data. More specifically, the transfer processor 214 updates the address translation information for the written value data via the address translation information manager 216 such that the storage position offset information will not indicate the position in the transfer source slot but will indicate the new position in the transfer destination slot.

The transfer processor 214 collects a slot all of whose value data becomes invalid thorough the transfer processing as a vacant slot.

Next, the processing executed by the data storage device 2 of the present embodiment (the processing of each functional module in the controller 21) will be described with reference to the accompanying flowcharts.

Figure 23:
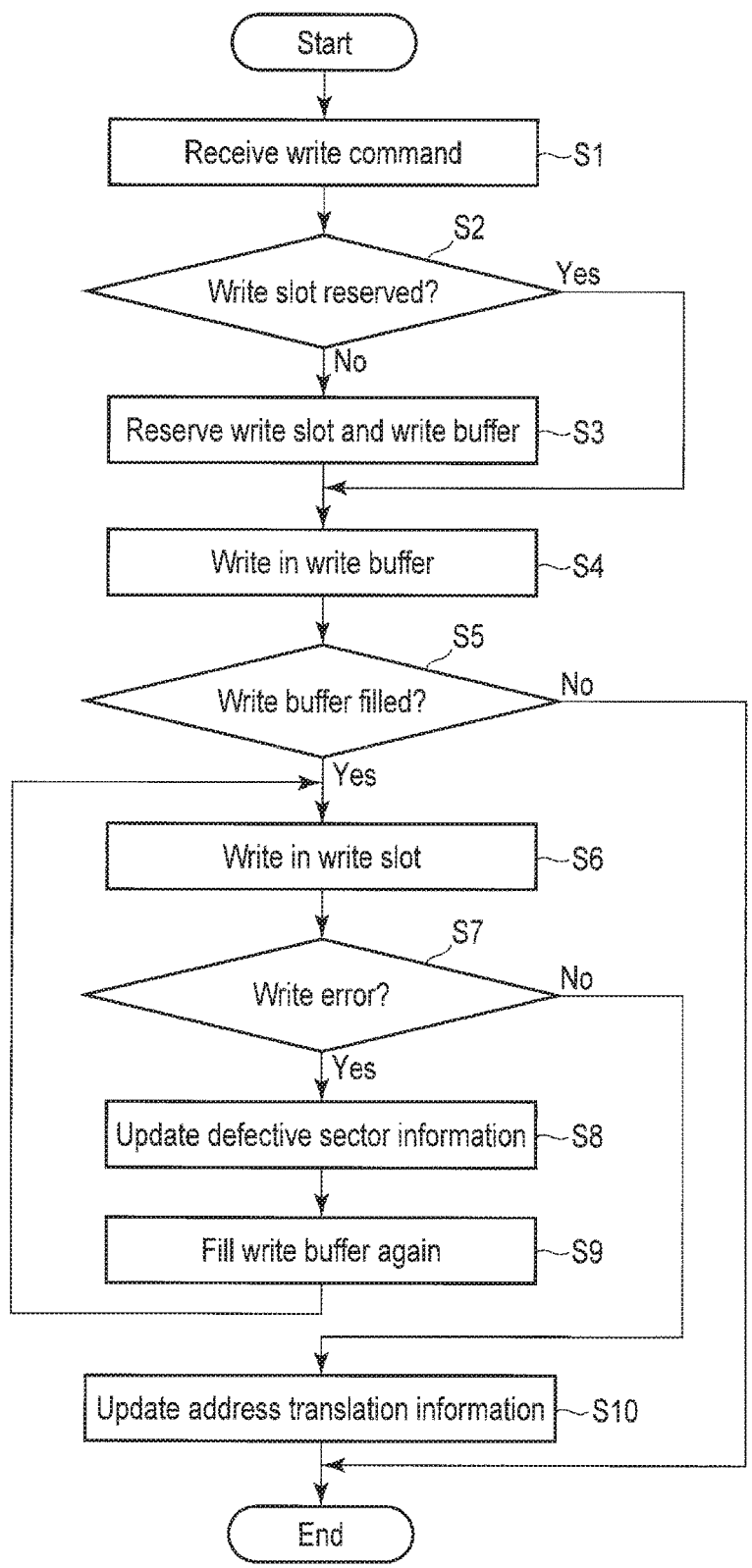
FIG. 23 is a flowchart showing an example of the procedure of write processing executed by the data storage device of the embodiment.

First, the procedure of write processing which is executed by the data storage device 2 in response to a write command from the host 1 will be described with reference to FIG. 23. FIG. 23 is a flowchart showing an example of the procedure of the write processing which is executed by the data storage device 2.

The host interface 217 receives a write command from the host 1 (step S1). The write command includes information of an identifier of write data, namely, information of a key, and the write data, namely, data of a value. The host interface 217 transfers the received write command to the write processor 212. When receiving the write command from the host interface 217, the write processor 212 extracts the key information and the value data from the received write command.

Then, the write processor 212 determines whether a write slot has been reserved or not (step S2).

If a write slot has not been reserved yet (no in step S2), the write processor 212 reserves a write slot and a write buffer (step S3). More specifically, the write processor 212 reserves a write slot from slots in which no valid data is stored (vacant slots). As the method of selecting the write slot, any well-known method can be used. Further, the write processor 212 reserves a write buffer of the size of the slot in the RAM 22. Still further, the write processor 212 refers to the in-slot defective sector presence information via the defective sector information manager 215, determines whether the write slot contains any defective sector or not, and lists, if the write slot contains a defective sector, the position of the defective sector in the write slot.

If a write slot has already been reserved (yes in step S2) or when securing a write slot, the write processor 212 writes the value data in the write buffer (step S4). More specifically, if the write sector does not contain any defective sector, the write processor 212 writes the value data in the write buffer via the memory interface 218, for example, as shown in FIG. 4. If the write slot contains a defective sector, the write processor 212 writes the value data in the write buffer via the memory interface 218, for example, as shown in FIG. 11. That is, in the processing of writing the value data in the write buffer, if the position of the defective sector overlaps the write area of the value data, the write processor 212 writes the value data while skipping the position of the defective sector via the memory interface 218. In the example shown in FIG. 11, since the write area of value data v2 overlaps the position of the defective sector, the write processor 212 writes value data v2 in the write buffer while skipping the position of the defective sector.

Note that the size and the position of the area to be skipped should preferably be aligned with an integral multiple of such a size and a position that the access performance of an Advanced Format HDD will not be degraded (4 Kbytes or the like). At this time, there is a case where the area to be skipped may become greater than the actual defective sector area as shown in FIG. 12. The slot size and the slot position are aligned with an integral multiple of the size and the position of the Advanced Format (4 Kbytes or the like). In the example of FIG. 12, the size of the slot is eight times the size of the Advanced Format. In general, the size of a defective sector (512 bytes or the like) often becomes less than the size of the Advanced Format, and thus the area to be skipped becomes greater than the actual defective sector area.

Note that there is also a case where the area to be skipped contains a plurality of defective sectors. Therefore, the defective sector information may be managed individually for each defective sector but may be managed collectively for each area to be skipped.

The write processor 212 determines whether the write buffer is filled with the value data or not (step S5). If the write buffer is not filled with the value data (no in step S5), the processing ends.

If the write buffer is filled with the value data (yes in step S5), the write processor 212 writes the value data in the write slot (step S6). More specifically, if the write slot does not contain any defective sector, as shown in FIG. 13, the write processor 212 reads the content of the write buffer including the blank area via the memory interface 218 and sequentially writes the read content in the write slot via the drive interface 219. If the write slot contains a defective sector, as shown in FIG. 14, the write processor 212 reads the content of the write buffer via the memory interface 218 and sequentially writes the read content in the write slot while skipping the area to be skipped (the position of the defective sector in the example shown in FIG. 14) via the drive interface 219. In the example shown in FIG. 14, two sequential write operations are performed in total. In this way, since the defective sector is skipped but arranged between the addresses of the sequential write operations, even if the first drive 23 is an HDD, the speed of the processing is less likely to decrease.

The write processor 212 determines whether a write error has occurred or not (step S7). If a write error has occurred (yes in step S7), the write processor 212 updates the defective sector information (step S8). More specifically, the write processor 212 updates the defective sector position information and the in-slot defective sector presence information for the sector in which the write error has occurred via the defective sector information manager 215.

The write processor 212 fills the write buffer again (step S9). More specifically, the write processor 212 fills the write buffer again according to the updated defective sector position information and the updated in-slot defective sector presence information. More specifically, the write processor 212 sets an area to be skipped again according to the updated defective sector position information and the updated in-slot defective sector presence information. Note that the write slot is not necessarily the slot in which the write error has occurred but may be a write slot which is reserved from vacant slots.

Then, the processing returns to step S6, and based on the content of the write buffer which has been filled again, the write processor 212 sequentially writes the content in the write slot while skipping the area to be skipped as necessary.

If no write error has occurred (no in step S7), the write processor 212 updates the address translation information. More specifically, the write processor 212 adds the entry including the key information, the storage position offset information, and the size information for the written value data, to the address translation information via the address translation information manager 216.

Here, as the key information, the key information extracted from the write command may be stored. As the storage position offset information, the front position of the storage area of the value data may be stored. Further, as the size information, regardless of whether the value data is written in the slot continuously without any skip operation or the value data is written in the slot intermittently with the skip operation of the area to be skipped, the size of the value data extracted from the write command may be stored. Here, to reduce the volume of the address translation information, the same size of the value data is stored as the size information regardless of whether the value data is written in the slot continuously without any skip operation or the value data is written in the slot intermittently with the skip operation of the area to be skipped. In general, the number of entries of the address translation information becomes significantly large. Therefore, if different storage formats are used for the address translation information of the value data written in the slot continuously without any skip operation and for the address translation information of the value data written in the slot intermittently with the skip operation of the area to be skipped, since the number of entries of the address translation information is large, the volume of the address translation information becomes enormous.

Figure 24:
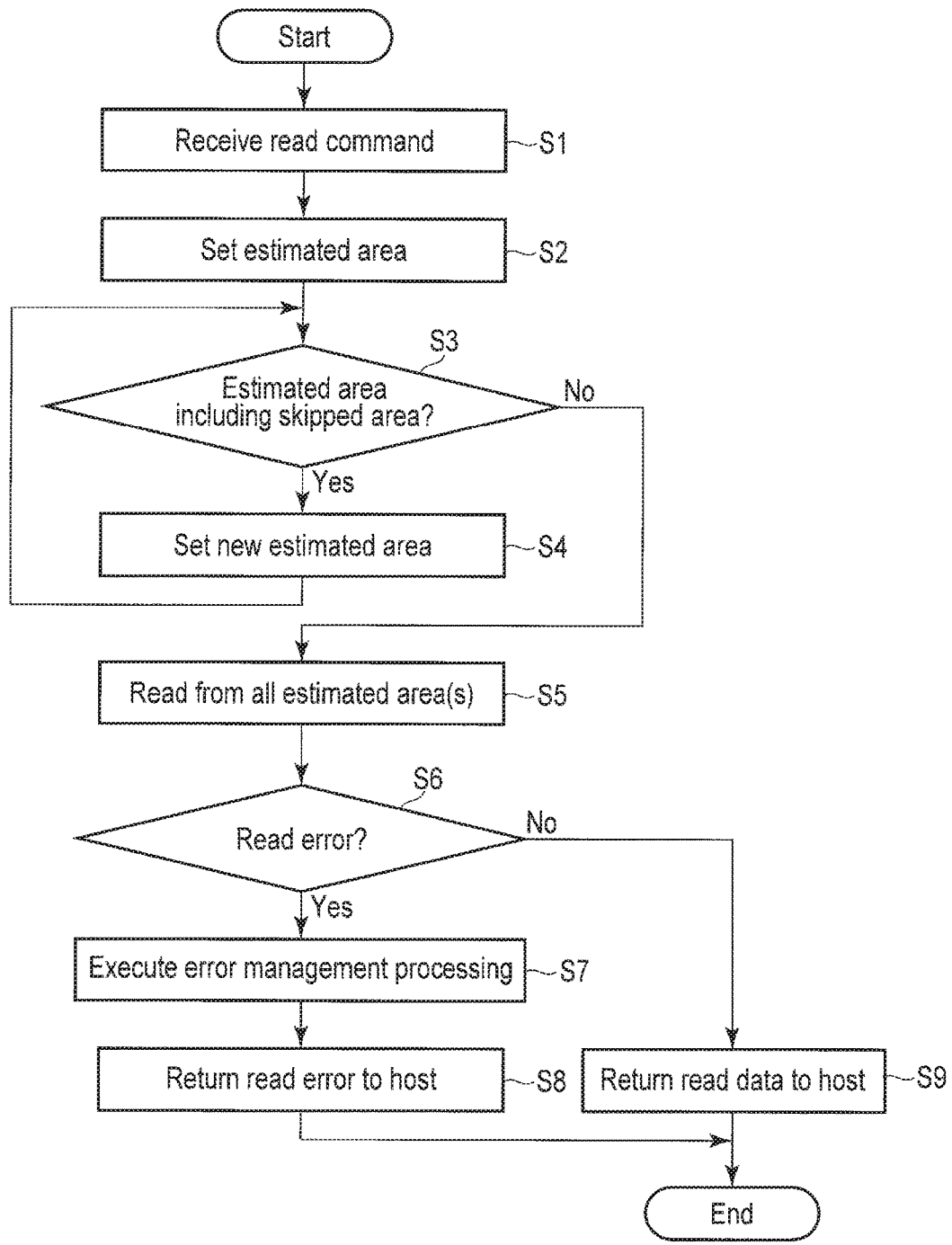
FIG. 24 is a flowchart showing an example of the procedure of read processing executed by the data storage device of the embodiment.

Next, the procedure of read processing which is executed by the data storage device 2 in response to a read command from the host 1 will be described with reference to FIG. 24. FIG. 24 is a flowchart showing an example of the procedure of the read processing which is executed by the data storage device 2.

The host interface 217 receives a read command from the host 1 (step S1). The read command includes key information. The host interface 217 transfers the received write command to the read processor 211. When receiving a read command from the host interface 217, the read processor 211 extracts the key information from the received read command.

Then, the read processor 211 sets an estimated area. More specifically, based on the extracted key information, the read processor 211 refers to the address translation information via the address translation information manager 216 and obtains the storage position offset information and the size information. Then, the read processor 211 sets an area starting from the position indicated by the storage position offset information and having the size indicated by the size information, an estimated area as shown in FIG. 16.

Note that, when determining that a magic number is stored in the obtained storage position offset information or the obtained size information, the read processor 211 transmits a read error to the host 1 via the host interface 217. The magic number may be, for example, a numerical value which will not be used as the storage position offset information or the size information. More specifically, for example, if the maximum size of a value data that the data storage device can accept is 9,999 Mbytes, a numerical value representing 10,000 Mbytes can be adopted as the magic number, but the magic number is not limited to this value.

The read processor 211 determines whether the estimated area includes an area which has been skipped in the write processing (defective sector) or not (step S3). More specifically, the read processor 211 refers to the in-slot defective sector presence information for the slot belonging to the storage position indicated by the storage position offset information via the defective sector information manager 215, and determines whether there is any defective sector in the slot or not. If there is a defective sector in the slot, the read processor 211 refers to the defective sector position information via the defective sector information manager 215, and determines whether the estimated area includes an area which has been skipped in the write processing (defective sector) or not. An example where the estimated area includes the skipped area is shown in FIG. 17. In the example shown in FIG. 17, the estimated area shown in FIG. 16 includes two skipped areas.

If the estimated area includes an area which has been skipped in the write processing (defective sector) (yes in step S3), the read processor 211 sets a new estimated area (step S4). More specifically, if the estimated area includes an area which has been skipped in the write processing (defective sector), the read processor 211 sets the end position of the estimated area as a new start position and the size of the total area of the skipped areas included in the estimated area as a new size, and sets the area defined by the new start position and the new size as a new estimated area. An example of the new estimated area in the example shown in FIG. 17 is shown in FIG. 18. In the example shown in FIG. 17, since the estimated area includes two skipped areas, the new size corresponds to the total size of the two skipped areas.

Further, the processing returns to step S3, and the read processor 211 determines whether the new estimated area includes any skipped area or not.

If the estimated area does not include any area which has been skipped in the write processing (defective sector) (no in step S3) or when setting the new estimated area (step S4), the read processor 211 reads the value data from all the estimated area(s) (step S5). The read processor 211 sequentially reads the value data from all the estimated area(s) while skipping the area which has been skipped in the write processing (defective sector), if any, via the drive interface 219. FIG. 19 shows an example of the sequential read operations of all the estimated areas shown in FIG. 18. In FIG. 19, as the areas which have been skipped in the write processing (defective sectors) are skipped, three sequential read operations are performed. In this way, although the defective sectors are skipped, the addresses of sequential write operations are arranged along the same line via the defective sectors. Therefore, even if the first drive 23 is an HDD, the speed of the processing is less likely to decrease.

In contrast, FIG. 20 shows an example of the sequential read operation of the estimated area shown in FIG. 16 which does not include any area which has been skipped in the write processing (defective sector). In FIG. 20, since the estimated area does not include any area which has been skipped in the write processing (defective sector), one sequential read operation is performed.

The read processor 211 determines whether a read error has occurred or not (step S6). If a read error has occurred (yes in step S6), the read processor 211 executes read error management processing (step S7). More specifically, the read processor 211 updates the defective sector position information and the in-slot defective sector presence information for the sector in which the read error has occurred via the defective sector information manager 215. In this way, when the slot is collected as a vacant slot in the transfer processing which will be described later and is then reserved as a write slot, the write processing will be performed properly.

Further, the read processor 211 updates the address translation information for the data corresponding to the read error via the address translation information manager 216 for storing the magic number in the storage position offset information or the size information. In this way, even if a read request is made for the same key again, the processing will be performed properly. A specific example is shown in FIG. 21. In the storage area of the value data corresponding to the key, the sector in which the read error has occurred in the current read processing is included. Therefore, the defective sector position data is updated as described above, and the sector in which the read error has occurred is registered in the defective sector position information. If a read request is made to the same key in this state, the processing is executed according to the above-described read processing, that is, the sector in which the read error has occurred in the current read processing will be skipped, and an area which is subsequent to the area of the value data corresponding to the key and in which another data is stored will be read. As a result, the read error will not occur, but the incorrect data will be returned to the host 1. Therefore, to return a read error to the host 1 when the read request is made to the same key again, the magic number is stored in the storage position offset information or the size information. Here, it is also possible to delete the key information from the address translation information instead of storing the magic number. In that case, when a read request is made to the same key again, the read request will be processed as a read request to a key which is not stored in the address translation information. Here, it is also possible to return a read error to the host 1 when a read request is made to a key which is not stored in the address translation information.

The read processor 211 returns a read error to the host 1 (step S8). More specifically, with respect to the data in which the read error has occurred, the read processor 211 returns a read error to the host 1 via the host interface 217. Then, the processing ends.

If no read error has occurred (no in step S6), the read processor 211 returns the read data to the host 1 (step S9). More specifically, in the case of reading data while skipping an area which has been skipped in the write processing, the read processor 211 connects all the read data and returns it to the host 1 via the host interface 217. Here, the RAM 22 may be used as a working area for connecting the read data. In the case of reading data without skipping any area, the read processor 211 directly returns the read data to the host 1 via the host interface 217. When receiving the read data from the read processor 211, the host interface 217 transfers the received data to the host 1.

Next, the procedure of delete processing which is executed by the data storage device 2 in response to a delete command from the host 1 will be described with reference to FIG. 25. FIG. 25 is a flowchart showing an example of the procedure of the delete processing which is executed by the data storage device 2.

The host interface 217 receives a delete command from the host 1 (step S1). The delete command includes key information. The host interface 217 transfers the received delete command to the delete processor 213. When receiving a delete command from the host interface 217, the delete processor 213 extracts the key information from the received delete command.

The delete processor 213 deletes the extracted key information from the address translation information. More specifically, the delete processor 213 deletes an entry including the extracted key information from the address translation information via the address translation information manager 216.

Next, the procedure of transfer processing which is executed by the data storage device 2 will be described with reference to FIG. 26. FIG. 26 is a flowchart showing an example of the procedure of the transfer processing which is executed by the data storage device 2.

The transfer processor 214 performs the transfer processing if predetermined conditions are satisfied. As the predetermined conditions, any well-known methods can be used. For example, the transfer processing is executed if the number of remaining vacant slots becomes less than a predetermined number. Further, when a read command or a write command is issued from the host 1 while the transfer processing performed, there is a case where the response speed to the read command or the write command from the host 1 or the transfer speed decreases. Therefore, for example, the transfer processing may be executed if the load of the command from the host 1 becomes less than a predetermined threshold.

The transfer processor 214 reserves a transfer destination slot to which value data is transferred, lists the position of a defective sector in the slot, and prepares a write buffer (step S1). Here, the processing is similar to the write processing of step S3 (FIG. 23), and thus detailed description thereof will be omitted.

The transfer processor 214 selects a transfer source slot from which value data is transferred (step S2). As the method of selecting the transfer source slot, any well-known method can be used. For example, if a slot whose total size of value data corresponding to valid keys is the smallest is selected first, a greater number of slots can be collected as vacant slots in one transfer processing. Therefore, the method of selecting a slot whose total size of value data corresponding to valid keys is the smallest first may be used as an example, but this is in no way restrictive. Further, the total size of value data corresponding to valid keys in the slot may be calculated from the address translation information or may be managed separately from the address translation information.

The transfer processor 214 reads value data corresponding to valid keys from the transfer source slot (step S3). Here, the processing of reading the value data corresponding to the valid keys is similar to the read processing of steps S2 to S5 (FIG. 24), and thus detailed description thereof will be omitted.

The transfer processor 214 writes the read value data in the write buffer (step S4). Here, the processing of writing the value data in the write buffer is similar to the write processing of step S4 (FIG. 23), and thus detailed description thereof will be omitted.

The transfer processor 214 appropriately repeats the above-described processing until the write buffer is filled with the value data. More specifically, the transfer processor 214 determines whether the write buffer is filled with the value data or not (step S5). If the write buffer is not filled with the value data (no in step S5), the transfer processor 214 then determines whether all the value data corresponding to the valid keys are read from the transfer source slot (step S6). If all the value data has not been read yet (no in step S6), the processing returns to step S3. If all the value data has already been read (yes in step S6), the processing returns to step S2.

If the write buffer is filled with the value data (yes in step S5), the transfer processor 214 writes the content of the write buffer in the write slot (step S7). Here, the processing of writing the content of the write buffer in the write slot is similar to the write processing of step S6 (FIG. 23), and thus detailed description thereof will be omitted.

The transfer processor 214 updates the address translation information for the written value data (step S8). More specifically, the transfer processor 214 updates the address translation information for the written value data via the address translation information manager 216 such that the storage position offset information will not indicate the position in the transfer source slot but will indicate the new position in the transfer destination slot.

Then, the transfer processor 214 collects the transfer source slot from which the value data has been transferred as a vacant slot (step S9). More specifically, the transfer processor 214 collects a slot whose value data becomes invalid thorough the transfer processing as a vacant slot.

For example, in a conventional LBA storage device, if a read error or a write error has occurred in the drive (such as an HDD), replacement of the drive is a precondition for handling this situation. One of the reasons is that the file system is so susceptible to the read error or the write error that, once the metadata of the file system on the storage system is broken, it is highly likely that the whole file system will no longer be restorable.

Conventionally, the storage system has adopted a redundant structure such as an RAID structure, but the reason for adopting the redundant structure is to prevent data from being lost after the data error has occurred and before the replacement/rebuilding process is complete, and here the replacement of the drive in which the data error has occurred is still a precondition for handling this situation. Further, as the capacity of the drive increases, the rebuilding process time has increased, accordingly, and the rebuilding process has become a process of a few days. Consequently, performance penalties such as an increase in the downtime of the system or a decrease in the service performance become noticeable.

To improve the reliability of the storage system, it is necessary to use a highly reliable and expensive drive, but this leads to cost increase. On the other hand, if an inexpensive drive is used, for example, in a large-scale data center, the rebuilding process may always be performed somewhere in the data center. Therefore, the use of an inexpensive drive not only causes performance penalties such as an increase in the downtime and a decrease in the service performance, but also causes increases in the cost of the replacement drive and the cost in the operations of service personnel such as the drive replacement and the rebuilding process.

In contrast, according to the data storage device 2 of the present embodiment, even if a read error occurs, since the impact of the error is limited to specific value data, the error will not lead to the loss of the whole data stored in the storage system. Further, it is also possible to continue the operation for a long time by avoiding a sector in which a read error or a write error has occurred (by reducing the capacity). In this way, the present embodiment can achieve cost reduction. Further, in the data storage device 2 of the present embodiment, although a defective sector is skipped, the addresses of sequential write operations are arranged along the same line via the defective sector. Therefore, the speed of the processing is less likely to decrease.

That is, according to the data storage device 2 of the present embodiment, it is possible to reduce the cost without degrading the reliability and the performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An object storage system configured to store a key and a value in association with each other, the object storage system comprising:
a first storage region in which the value is stored;
a second storage region in which first information and second information are stored, the first information being used for managing an association between the key and a storage position of the value, the second information being used for managing a position of a defective storage area in the first storage region; and
a controller configured to control the first storage region and the second storage region, wherein the controller comprises a write processor configured to:
determine whether there is a defective storage area in a storage area reserved in the first storage region as a write area for a write value or not based on the second information;
execute, when determining that there is a defective storage area, write processing of writing the write value in the first storage region by arranging the write value for an area other than the defective storage area in the storage area reserved in the first storage region to avoid the defective storage area; and
execute, when determining that there is no defective storage area, write processing of writing the write value in the first storage region by arranging the write value for the entire storage area reserved in the first storage region.

2. The object storage system of claim 1, wherein the write processor is configured to execute the write processing by sequential writing.

3. The object storage system of claim 1, wherein the write processor is configured to align at least one of a size and a position of the storage area reserved in the first storage region as the write area for the write value, and a size and a position of an area excluded from the storage area reserved in the first storage region and including the defective storage area, with an integral multiple of a predetermined size or position.

4. The object storage system of claim 1, wherein the write processor is configured to update, when a write error occurs in the write processing, the second information to add information of a position of a storage area in which the write error is occurred.

5. The object storage system of claim 4, wherein the write processor is configured to execute the write processing by rearranging the write value for the storage area reserved in the first storage region to avoid the defective storage area based on the updated second information.

6. The object storage system of claim 4, wherein the write processor is configured to:
reserve a new storage area in the first storage region as a write area for the write value, the new storage area being different from the storage area reserved in the first storage region and including the storage area in which the write error is occurred; and
execute write processing of writing the write value in the first storage region by arranging the write value for the new storage area reserved in the first storage region.

7. The object storage system of claim 1, wherein the controller comprises a read processor configured to:
specify a storage area in the first storage region as a read area for read value based on the first information;
determine whether there is a defective storage area in the specified storage area or not based on the second information; and
execute, when determining that there is a defective storage area, read processing of reading the read value from the first storage region by extending the storage area in the first storage region as the read area for the read value for a size of the defective storage area, and return the read value to a requester.

8. The object storage system of claim 7, wherein the read processor is configured to execute the read processing by sequential reading.

9. The object storage system of claim 7, wherein the read processor is configured to update, when a read error occurs in the read processing, the second information to add information of a position of a storage area in which the read error is occurred, and to return a read error to the requester.

10. The object storage system of claim 9, wherein the read processor is configured to update the first information to replace a value indicating a storage position of the read value in which the read error is occurred with a predetermined value which is not be used in the first storage region.

11. The object storage system of claim 10, wherein the read processor is configured to return a read error to the requester, when specifying the storage area in the first storage region as the read area for the read value based on the first information and when obtaining the predetermined numerical value as the numerical value indicating the storage position of the read value.

12. The object storage system of claim 9, wherein the read processor is configured to update the first information to delete information of a key of the read value in which the read error is occurred.

13. The object storage system of claim 12, wherein the read processor is configured to return a read error to the requester, when specifying the storage area in the first storage region as the read area for the read value based on the first information and when determining that the information of the key of the read value is not included in the first information.

14. A controller of an object storage system configured to store a key and a value in association with each other, the object storage system comprising a first storage in which the value is stored and a second storage region in which first information and second information are stored, the first information being used for managing an association between the key and a storage position of the value, the second information being used for managing a position of a defective storage area in the first storage region, the controller comprising a write processor configured to:
determine whether there is a defective storage area in a storage area reserved in the first storage region as a write area for a write value or not based on the second information;
execute, when determining that there is a defective storage area, write processing of writing the write value in the first storage region by arranging the write value for an area other than the defective storage area in the storage area reserved in the first storage region to avoid the defective storage area; and
execute, when determining that there is no defective storage area, write processing of writing the write value in the first storage region by arranging the write value for the entire storage area reserved in the first storage region.

15. A non-transitory computer-readable storage medium having stored thereon a computer program which is executable by a computer which controls an object storage system configured to store a key and a value in association with each other, the object storage system comprising a first storage in which the value is stored and a second storage region in which first information and second information are stored, the first information being used for managing an association between the key and a storage position of the value, the second information being used for managing a position of a defective storage area in the first storage region, the computer program controlling the computer to execute functions of:
determining whether there is a defective storage area in a storage area reserved in the first storage region as a write area for a write value or not based on the second information;
executing, when determining that there is a defective storage area, write processing of writing the write value in the first storage region by arranging the write value for an area other than the defective storage area in the storage area reserved in the first storage region to avoid the defective storage area; and
executing, when determining that there is no defective storage area, write processing of writing the write value in the first storage region by arranging the write value for the entire storage area reserved in the first storage region.

16. The controller of claim 14, wherein the write processor is configured to execute the write processing by sequential writing.

17. The controller of claim 14, further comprises a read processor configured to:
specify a storage area in the first storage region as a read area for read value based on the first information;
determine whether there is a defective storage area in the specified storage area or not based on the second information; and
execute, when determining that there is a defective storage area, read processing of reading the read value from the first storage region by extending the storage area in the first storage region as the read area for the read value for a size of the defective storage area, and return the read value to a requester.

18. The controller of claim 17, wherein the read processor is configured to execute the read processing by sequential reading.

19. The non-transitory computer-readable storage medium of claim 18, wherein the write processing is executed by sequential writing.

20. The non-transitory computer-readable storage medium of claim 18, wherein the computer program further controlling the computer to execute functions of:
- specifying a storage area in the first storage region as a read area for read value based on the first information;
- determining whether there is a defective storage area in the specified storage area or not based on the second information; and
- executing, when determining that there is a defective storage area, read processing of reading the read value from the first storage region by extending the storage area in the first storage region as the read area for the read value for a size of the defective storage area, and returning the read value to a requester.

* * * * *